US009813294B2

(12) United States Patent
Heintz et al.

(10) Patent No.: US 9,813,294 B2
(45) Date of Patent: Nov. 7, 2017

(54) OPTIMIZATION OF A HOME AUTOMATION SYSTEM USING A LOCAL POWER LINE COMMUNICATION NETWORK

(75) Inventors: Bruno Heintz, Paris (FR); Jean-Marc Oury, Paris (FR); Hugues Lefebvre De Saint Germain, Saint-foy-les-Lyon (FR); Stanislas De Crevoisier, Levallois-Perret (FR); Christophe Bornet, Asnieres sur Seine (FR)

(73) Assignee: VOLTALIS, Paris (FR)

( * ) Notice: Subject to any disclaimer, the term of this patent is extended or adjusted under 35 U.S.C. 154(b) by 903 days.

(21) Appl. No.: 14/343,117

(22) PCT Filed: Sep. 10, 2012

(86) PCT No.: PCT/FR2012/052015
§ 371 (c)(1),
(2), (4) Date: Jun. 24, 2014

(87) PCT Pub. No.: WO2013/038095
PCT Pub. Date: Mar. 21, 2013

(65) Prior Publication Data
US 2014/0328157 A1 Nov. 6, 2014

(30) Foreign Application Priority Data
Sep. 13, 2011 (FR) ...................... 11 58108

(51) Int. Cl.
*H04L 12/24* (2006.01)
*H04B 3/54* (2006.01)
(Continued)

(52) U.S. Cl.
CPC .............. *H04L 41/083* (2013.01); *H02J 3/14* (2013.01); *H02J 13/0024* (2013.01);
(Continued)

(58) Field of Classification Search
CPC ........... H04L 12/2803; H04L 29/12207; H04L 12/2809; H04L 12/281; H04L 12/2838;
(Continued)

(56) References Cited

U.S. PATENT DOCUMENTS 6,492,897 B1 * 12/2002 Mowery, Jr. ............. H04B 3/54
340/313
2004/0136393 A1 7/2004 Blasco Claret et al.
(Continued)

FOREIGN PATENT DOCUMENTS

| GB | 2443009 | 4/2008 |
| WO | WO03100996 | 12/2003 |
| WO | WO2009047965 | 4/2009 |

OTHER PUBLICATIONS

Search Report Dated 2012.

*Primary Examiner* — Andrew Lai
*Assistant Examiner* — M Mostazir Rahman
(74) *Attorney, Agent, or Firm* — IPSILON USA, LLP (57) ABSTRACT

A method for optimizing a home automation system is provided having a plurality of communicating devices capable of exchanging information therebetween via a local low bandwidth PLC (Power Line Communication) network. The method includes a phase in which the PLC transmission power is adjusted for each new device added to the network. The phase includes the following successive steps: installing (10) the new device configured to transmit at a predefined maximum power on said PLC network; cutting off (20) all ongoing communications on the PLC network except for the new device; testing communication for each pre-existing device on the PLC network with which the new device is to be paired and, if communication fails, ensuring an automatic incremental increase (30) of the PLC transmission power of the pre-existing device until a first PLC transmission power value is reached at which PLC communication can be
(Continued)

initialized between the pre-existing device and the new device; and ensuring an automatic reduction (40) of the PLC transmission power of the new device while communication between each pre-existing device and the new device is active.

12 Claims, 4 Drawing Sheets

(51) Int. Cl.
    *H04L 12/28*     (2006.01)
    *H02J 3/14*     (2006.01)
    *H02J 13/00*     (2006.01)

(52) U.S. Cl.
    CPC ......... *H04B 3/544* (2013.01); *H04L 12/2803* (2013.01); *H04L 12/2809* (2013.01); *H04L 12/2838* (2013.01); *H04L 41/0654* (2013.01); *H04L 41/0806* (2013.01); *H02J 2003/143* (2013.01); *H04B 2203/5458* (2013.01); *H04L 2012/285* (2013.01); *H04L 2012/2843* (2013.01); *Y02B 70/325* (2013.01); *Y02B 90/2623* (2013.01); *Y02B 90/2692* (2013.01); *Y04S 20/228* (2013.01); *Y04S 40/122* (2013.01); *Y04S 40/146* (2013.01)

(58) Field of Classification Search
    CPC ....... H04L 2012/2843; H04L 2012/285; H04L 41/0654; H04L 41/0806; H04L 41/083; H02J 13/0024; H02J 2003/143; H02J 3/14; H04B 2203/5458; H04B 3/544
    See application file for complete search history.

(56) References Cited

U.S. PATENT DOCUMENTS

| | | | |
|---|---|---|---|
| 2004/0208117 A1* | 10/2004 | Kim | H04L 12/2803 370/216 |
| 2007/0149189 A1* | 6/2007 | Yang | H04L 12/2602 455/428 |
| 2009/0268752 A1 | 10/2009 | Miyazaki et al. | |
| 2010/0013609 A1* | 1/2010 | Symoen | G08C 17/02 340/12.32 |
| 2010/0202471 A1* | 8/2010 | Maki | H04B 3/542 370/442 |
| 2010/0313051 A1* | 12/2010 | Hua | H04B 3/542 713/323 |
| 2011/0102159 A1 | 5/2011 | Olson et al. | |
| 2011/0199890 A1* | 8/2011 | Sadan | H04W 84/10 370/216 |
| 2012/0027062 A1* | 2/2012 | Garcia | H04B 3/544 375/224 |
| 2012/0235646 A1* | 9/2012 | Lo | H02J 7/0027 320/137 |
| 2014/0328157 A1* | 11/2014 | Heintz | H04B 3/544 370/216 |

* cited by examiner

OPTIMIZATION OF A HOME AUTOMATION SYSTEM USING A LOCAL POWER LINE COMMUNICATION NETWORK

RELATED APPLICATIONS

This application is a National Phase Application of PCT/FR2012/052015, filed on Sep. 10, 2012, which in turn claims the benefit of priority from French Patent Application No. 11 58108 filed on Sep. 13, 2011, the entirety of which are incorporated herein by reference.

BACKGROUND

Field of the Invention

The present invention relates to the optimization of a home-automation system comprising a plurality of communicating appliances able to exchange information among themselves via a local low-bitrate PLC network.

Description of Related Art

Several communication systems are used today for home-automation networks. One of the most popular, because it relies on the already existing electrical network, is Power Line Communication, or PLC.

Certain PLC solutions, offering a high bitrate, exhibit the major drawback of affording only short ranges, of the order of a few tens of meters. Others offer much more significant ranges, up to 500 meters, and are less expensive, but at the price of relatively low bitrates of the order of a few kilobits per second). These latter solutions are very well suited to numerous home-automation applications such as the management and the remote control of electrical appliances (lighting, heating, air-conditioning, roller blinds, ovens), sensors (of presence, of temperature, of humidity), of remote reading of intelligent meters (water, gas, electricity), etc.

However, such solutions will exhibit operating problems if the network gets denser, and exceeds a few tens of appliances communicating regularly over the network, because the available bandwidth will then no longer be sufficient co allow each appliance to communicate with its interlocutors or its relays.

Furthermore, even in the case where a home-automation system is envisaged with a limited number of appliances communicating via the local low-bitrate PLC network, the various phases of the electrical distribution network as well as the electrical energy meters installed at the premises of individuals generally allow the PLC signals to pass. It follows from this that other PLC devices outside the home-automation system considered may disturb the electrical line and reduce the bitrate. Likewise, the PLC communications between the communicating appliances of the home-automation system may go beyond the local network, and this may raise confidentiality problems.

Figure 1:
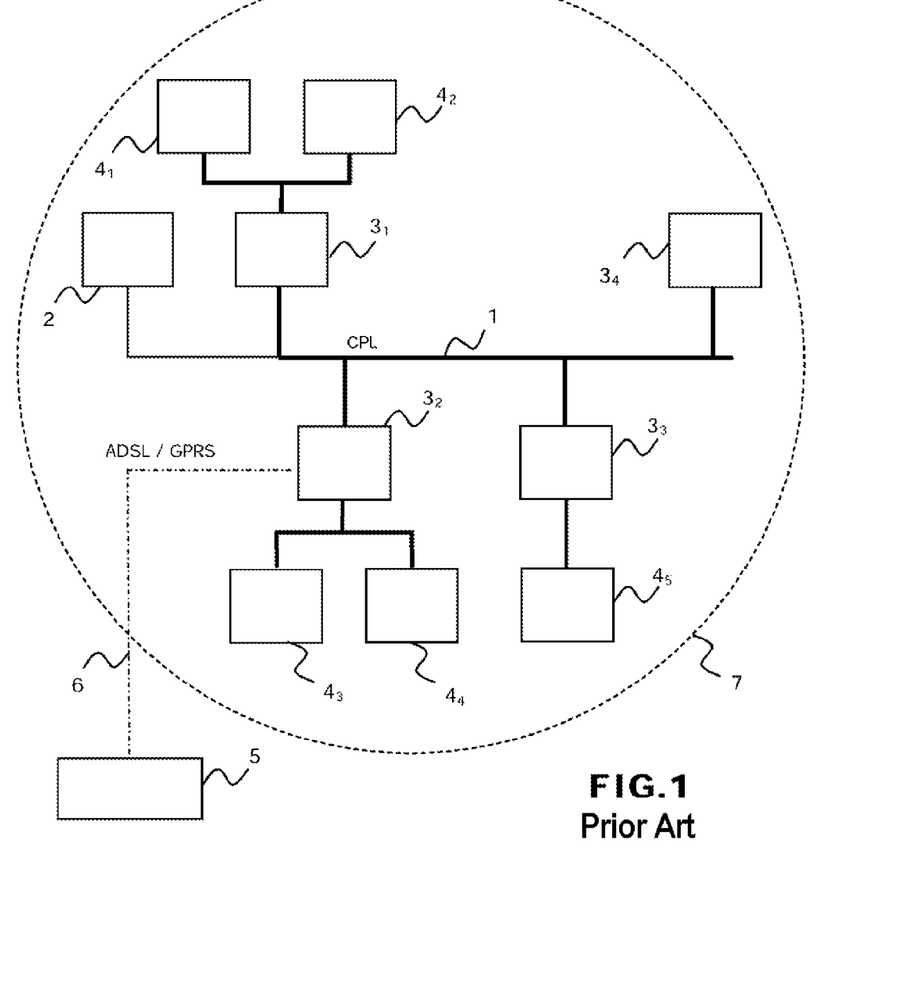
FIG. 1, already described hereinabove, schematically represents the operation of a portion of a known system for measurement and modulation in real time of the electrical consumption of a plurality of electrical devices.

By way of nonlimiting example, represented in FIG. 1 is a portion of a system for measurement and modulation in real time of a plurality of electrical devices using appliances communicating locally with one another over a PLC low-bitrate network. The principle of this system is described in particular in document WO 2008/017754 in the name of the Applicant. In the example illustrated, the portion of the system allows the management of a plurality of electrical devices (not represented), all powered from one and the same electrical line 1 of the electrical distribution network, situated for example in the residence of an individual, downstream of an electrical board 2. In this example, the system comprises four drive boxes $3_1$ to $3_4$ and five modulator boxes $4_1$ to $4_5$ organized according to a local PLC low-bitrate network. Each modulator box is able to be linked to one or more electrical devices (such as water heaters, electric radiators, air-conditioners, etc.), and is used to measure in real time the voltages and the currents consumed by these electrical devices, and to dispatch periodically, for example every ten minutes, the measurements to an external central platform 5 hosted by an Internet server. Accordingly, the measurements carried out by each modulator box are firstly transmitted to the drive box to which it is connected on the local PLC network, and then to the external platform 5 by way of a wireless communication modem (not represented) integrated into the drive box, and allowing a connection 6 of packet telephony type (GPRS, 3G or 4G) and/or of ADSL type. So as not to needlessly overload the figure, only the connection 6 between the drive box $3_2$ and the platform 5 has been represented by a dashed line, to differentiate it from the PLC local network shown by a solid line. In the example represented, the drive box $3_1$ thus serves as relay for the two modulator boxes $4_1$ and $4_2$, the drive box $3_2$ serves as relay for the two modulator boxes $4_3$ and $4_4$, and the drive box $3_3$ serves as relay for the modulator box $4_5$. The measurements received by the external platform 5 are stored and can be viewed at any time and from anywhere by the user who can connect to his user space on the Internet by any known means. The external platform 5 is for its part able to dispatch to the drive boxes, through the wireless connection, commands to order the interruption of the power supply of all or some of the electrical devices linked to the various modulator boxes for a predetermined duration. The interruption periods are generally less than half an hour, so that the users affected by the cutting off of all or some of their electrical appliances, such as heaters or air-conditioners, do not experience any inconvenience. The monitoring of the power supply is performed by way of the modulator boxes.

This system, in addition to the possibility of tracking the consumptions by each user, makes it possible to manage simultaneously at the centralized platform a large quantity of modulator boxes and drive boxes and to modulate more easily, on a town, state, regional or national scale, the electrical power consumed by a collection of users, in particular during spikes in consumption, without it being necessary for the electrical energy suppliers to produce more electricity.

Today, the various drive and modulator boxes of such a system are all configured to transmit on the PLC network at one and the same predefined nominal transmission power. The PLC communication zone is represented schematically by the circle 7 in FIG. 1. Thus, the bandwidth on the electrical line 1 is already occupied, in the example of FIG. 1 by all the appliances of the PLC network, i.e. here by nine appliances, counting the four drive boxes $3_1$ to $3_4$ and the five modulator boxes $4_1$ to $4_5$. The addition of a further device on this PLC network or any disturbance originating from a device of a neighboring PLC network thus risks saturating the bandwidth. The bandwidth used may thus rapidly become critical on the electrical line, with the risk of blocking the network, certain appliances no longer succeeding in communicating.

OBJECTS AND SUMMARY

The present invention is aimed at optimizing the bandwidth of home-automation systems using a local low-bitrate PLC network.

Accordingly, the subject of the present invention is a method for optimizing a home-automation system comprising a plurality of communicating appliances able to exchange information among themselves via a local low-bitrate PLC network, characterized in that it comprises a phase of adjusting the PLC transmission power for each new communicating appliance joining the network, said adjusting phase comprising the following successive steps:

a) installation of the new able appliance whose PLC transmission power is set to a maximum power predefined in said PLC network;

b) cutting of any communication in progress on the PLC network, except for the new appliance;

c) for each existing appliance of the PLC network with which said new appliance has to be paired, test of the communication with said new appliance, and, in case of communication failure, automatic incremental increase of the PLC transmission power of the existing appliance until the obtaining of a first value of PLC transmission power for which a PLC communication can be initialized between the existing appliance and the new appliance;

d) on completion of step c), automatic reduction in the PLC transmission power of the new appliance as long as said communication between each existing appliance and the new appliance is operational.

The method can furthermore comprise a step of dynamic adaptation of the PLC transmission power of at least one communicating appliance of the PLC network, in the case where the latter encounters difficulties of communication with the network appliance or appliances with which it is paired.

This dynamic adaptation step comprises for example the detection by said communicating appliance of a degradation of the PLC signal quality, followed by an attempt to restore communication by automatically and progressively increasing its PLC transmission power until a correct communication quality is restored. As a variant or in combination, this dynamic adaptation step comprises the detection by said communicating appliance of a communication failure rate exceeding a certain threshold, followed by a request for progressive automatic reduction of the PLC transmission power of all the appliances communicating with the appliance that detected the problem so as to optimize the bandwidth consumed with respect to the topological necessities of the home automation system.

The subject of the present invention is also a home-automation system for the implementation of the previous optimization method, characterized in that it comprises a "master" device of the low-bitrate PLC network, able to transmit control signals to each communicating appliance of the PLC network so as to drive said phase of adjusting the PLC transmission power, and in particular to trigger steps b) to d).

According to other preferential characteristics of the system:

the "master" device is either an installation drive box able to be installed locally in the low-bitrate PLC network, or a central external platform hosted by the Internet network, able to transmit said control signals via a connection of packet telephony or ADSL type;

the installation drive box is able to transmit said control signals via the low-bitrate PLC network, or via a distinct link of the low-bitrate PLC network, in particular a link of ADSL, cellular, radio or Wifi type;

at least one of the communicating appliances of the low-bitrate PLC network is furthermore able to detect a degradation of the PLC signal quality, and to automatically increase its PLC transmission power to attempt to restore communication;

at least one of the communicating appliances of the low-bitrate PLC network is furthermore able to detect a communication failure rate exceeding a certain threshold, and the "master" device of the low-bitrate PLC network is then able to order an automatic reduction in the PLC transmission power of all or some of the appliances of the home-automation system;

the communicating appliances of the PLC network are modulator boxes able to be linked to one or more electrical devices and to measure in real time the voltages and the currents consumed by these electrical devices, and drive boxes able to transmit commands to order the interruption of the power supply of all or some of the electrical devices linked to the various modulator boxes.

BRIEF DESCRIPTION OF THE DRAWINGS

Various aspects of the invention will become apparent in the following description, given with reference to the appended figures, in which.

DETAILED DESCRIPTION

Hereinafter in the account, the elements common to the various figures bear the same references.

The present invention starts from the general finding according to which, except for PLC networks with so-called meshed topology, used when each element of the network has to be connected with all the elements of this network, it is often possible to adopt a network topology which does not require that all the appliances should have to communicate over the whole of the extent of the network. In particular, in the exemplary tree topology given in FIG. 1, the modulator boxes $4_1$ and $4_2$ need to exchange data only with the drive box $3_1$. Likewise, the modulator boxes $4_3$ and $4_4$ need to exchange data only with the drive box $3_2$. Finally, the modulator box $4_5$ has to exchange data only with the drive box $3_3$. Other topologies, such as the star topology, the ring topology, or any more complex mixed topology, can be used to group terminal devices (in the manner of the modulator boxes $4_1$ to $4_5$) and relay devices (such as the drive boxes $3_1$ to $3_4$) together in one and the same network.

The present invention thus proposes to optimize home-automation systems using a low-bitrate PLC home-automation network by intelligent management of the transmission power, and therefore of the range, of the appliances constituting the network.

Figure 2:
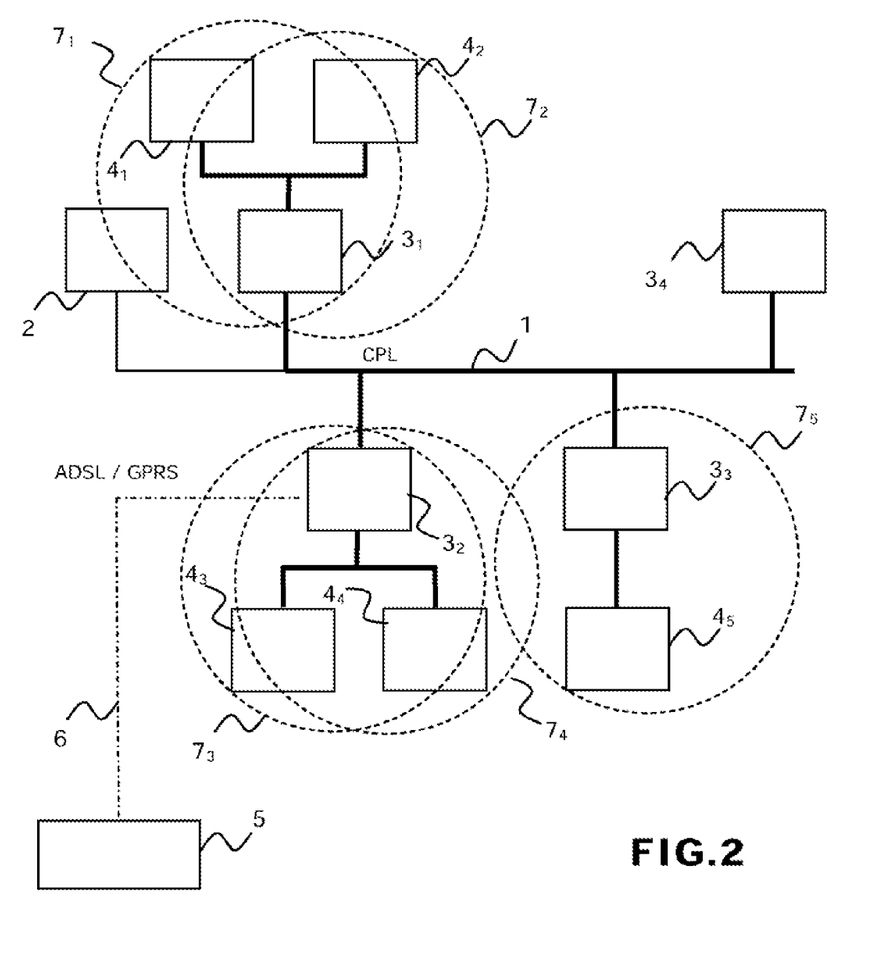
FIG. 2 schematically represents the operation of the portion of the system for measurement and modulation in real time of the electrical consumption of a plurality of electrical appliances, modified according to the principles of the invention.

This amounts in particular to modifying the system portion represented in FIG. 1, to obtain the system portion represented in FIG. 2, in which five circles $7_1$ to $7_5$ show diagrammatically the respective range, limited to the strictly necessary, of the modulator boxes $4_1$ to $4_5$, that is to say encompassing only the drive box with which each modulator box actually has to communicate. By doing this, the bandwidth used at any point of the network whatsoever is lower than in the case of FIG. 1, thus allowing a larger number of appliances to be hooked up to the network.

The intelligent management of the PLC transmission power in accordance with the invention must be able to be carried out:

on the one hand, at least at the time of the installation of a new component in the PLC network, since this installation may have an impact on the topology of the network and on the communication distances between two appliances;

on the other hand, preferably regularly during the use of the system, to take into account any situation liable to impact the network (case where the communication between two appliances no longer gets through, fault with an appliance, movement of an appliance, maintenance needs, etc.).

Various configurations of systems allowing the implementation of the method of optimization according to the invention of a home-automation system using a local PLC low-bitrate network will now be described with reference to FIGS. 3 and 4.

Figure 3:
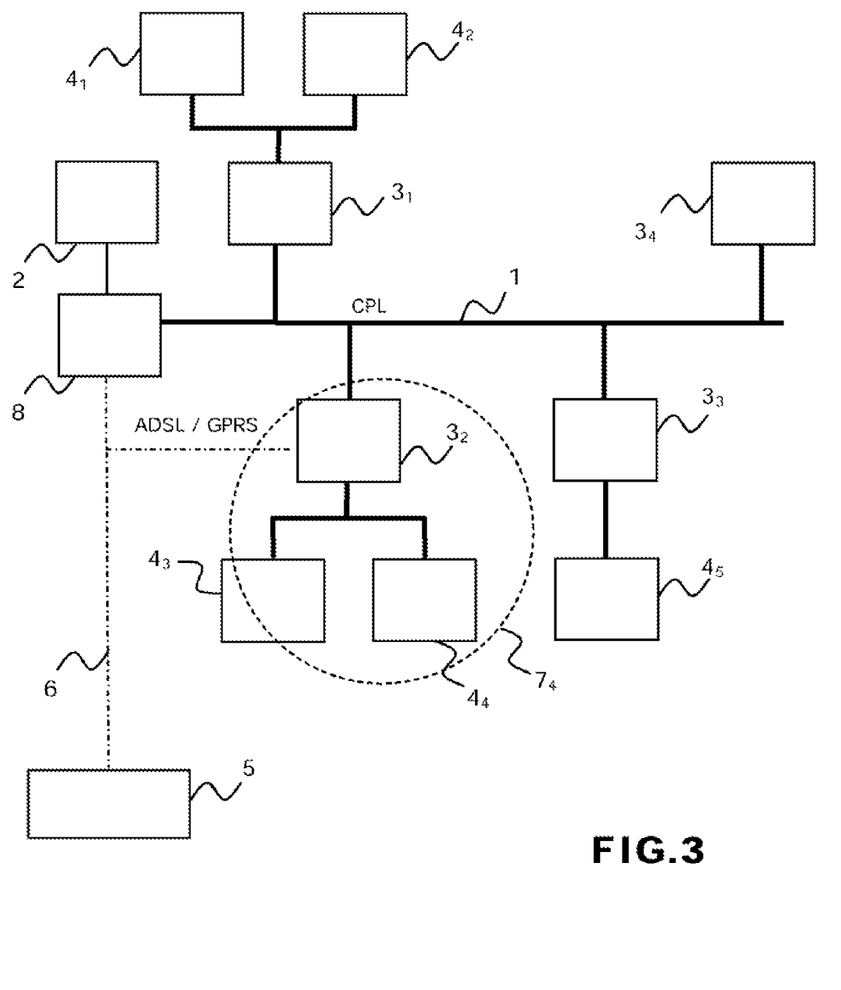
FIG. 3 illustrates a possible system for the optimization of the system portion of FIG. 2.
Figure 4:
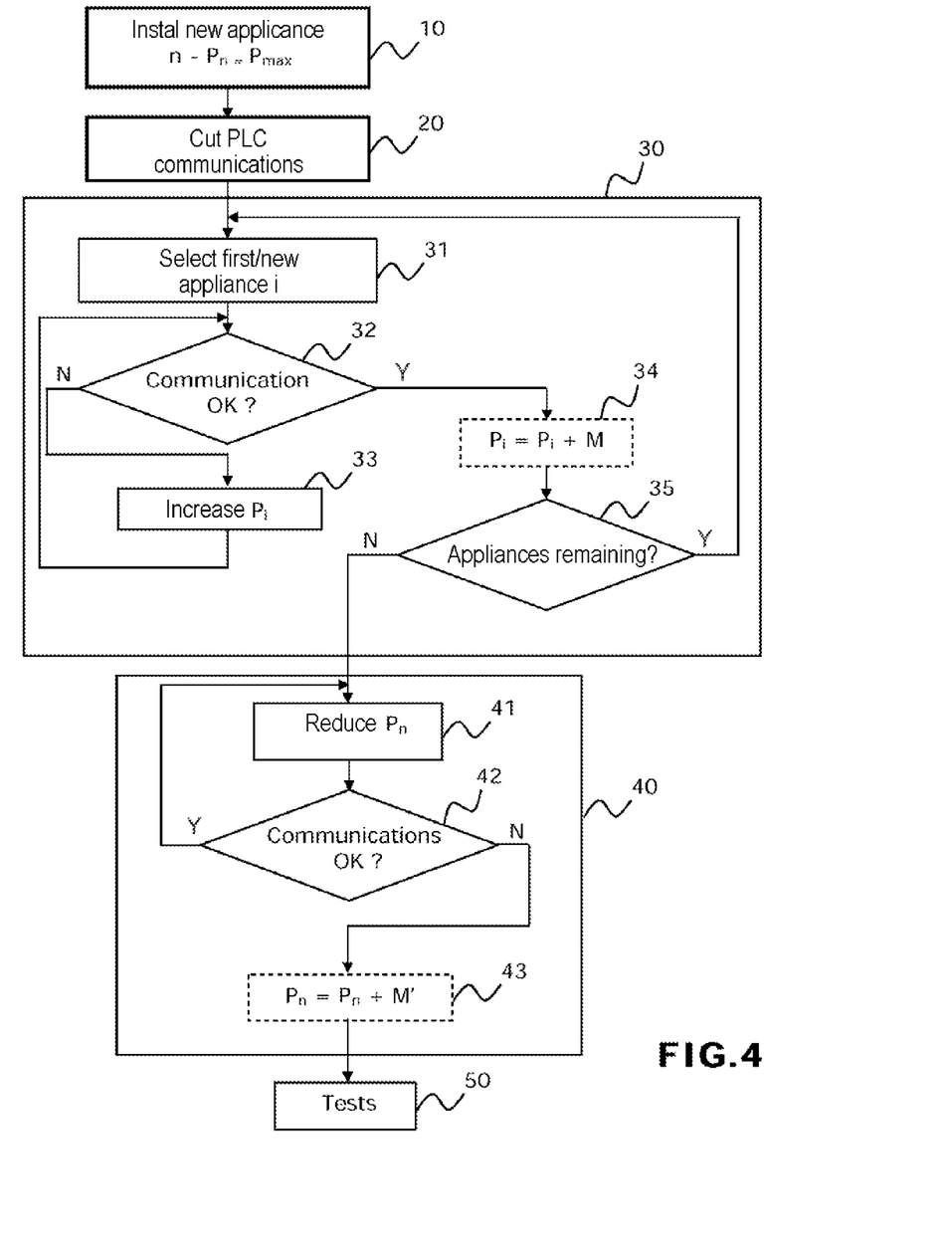
FIG. 4 represents various steps implemented in the method according to the invention.

FIG. 3 illustrates a first system making it possible to optimize the home-automation system of FIG. 2 at the time of the installation of a new device. It will be assumed hereinafter that the drive boxes $3_1$ to $3_4$, and the modulator boxes $4_1$ to $4_3$ and $4_5$ are appliances which already exist in the PLC network, and that the new appliance which has to join the network is the modulator box $4_4$.

The optimization method according to the invention will consist in providing for a phase of adjusting the PLC transmission power of the modulator box $4_4$ so as to obtain the range just necessary to allow communication of this modulator box $4_4$ with the devices of the PLC network with which it has to be paired. In our example, the modulator box $4_4$ has only to be able to exchange data with the drive box $3_2$.

Accordingly, the optimization system will use a "master" device of the PLC network, capable of accessing, directly or via relay appliances (here the drive boxes), all the appliances of the network, at precise times. In the system represented in FIG. 3, this "master" device is an installation drive box 8 installed in the PLC local network, and able to transmit PLC control signals to all the appliances of the PLC network so as to drive the process for adjusting the power of the new appliance.

According to a first variant, the installation drive box 8 can access all the appliances of the PLC network to transmit control signals to them using a distinct link of the PLC network, for example a link of ADSL, cellular (GPRS/3G/4G), Wifi, radio, or other type. In the particular application considered, the installation drive box 8 is also able to communicate with the external platform 5 via the ADSL/GPRS link 6.

The various steps implemented in accordance with the invention for the phase of adjusting the new appliance joining the PLC network, here the modulator box $4_4$, will now be explained with reference to FIG. 4:

One begins by installing the new appliance on the PLC network (step 10). The latter is then set to transmit PLC signals at a predefined power $P_n$ equal to a maximum value $P_{max}$, and is therefore potentially visible to all the other appliances of the PLC network. The installation drive box 8 will thus be able to enter into communication with this new appliance so as to validate proper hardware installation thereof.

The other constituent appliances of the network are then monitored to prohibit any PLC communication on the network (step 20). Accordingly, a first control signal is transmitted by the installation drive box 8 to all the appliances of the network, except for the new appliance, to order them to cut off any PLC communication that may possibly be in progress.

The installation drive box 8 will thereafter drive, during a step 30, the possible automatic increase of the transmission power $P_i$ of all the existing PLC network appliances with which the new appliance has to be paired, until the obtaining of a transmission power value $P_i$ for which a PLC communication can be established with the new appliance. Accordingly, a control signal is transmitted by the installation drive box 8 to each appliance having to be paired with the new appliance, so as to trigger a test of bidirectional communication on the basis of the current value of the transmission power $P_i$ of said appliance. The installation drive box employs for this purpose the list, recovered for example beforehand from the external central platform 5, of all the appliances of the network which have to be paired with the new appliance.

During the bidirectional communication test, each appliance may possibly have no increase its transmission power $P_i$, until a PLC communication can actually be established with the new device. This is represented schematically by sub-steps 31 to 33 of FIG. 4. Once the connection has been established, the transmission power $P_i$ may optionally be increased by a certain factor M (typically of the order of 20%) so as to give sufficient margin in case of future disturbance of the network (sub-step 34). It should be noted that a communication failure although the power $P_i$ has been increased up to its maximum possible value indicates a physical connection problem between the tested appliance and the new component, which will have to be dealt with by a technician if appropriate.

In the example considered, only the drive box $3_2$ has to be paired with the modulator box $4_4$, so that the installation drive box 8 will have to order only a single bidirectional communication test. In the more general case where a larger number of existing appliances has to be paired with the new device, step 30 is repeated for each appliance, as illustrated schematically by sub-step 35.

On completion of step 30, the installation drive box 8 will thereafter drive, during a step 40, the automatic reduction in the PLC transmission power $P_n$ of the new appliance, doing so as long as the communication between each existing appliance and the new appliance is operational. Several algorithms are possible. It is in particular possible to reduce the power by regular decrements until the PLC communication no longer gets through, as indicated by sub-steps 41 and 42 of FIG. 4. As a variant, the adjusting of the power $P_n$ is carried out by dichotomy. Here again, the minimum transmission power found $P_n$ may optionally be increased by a certain factor M' (typically of the order of 20%) so as to give sufficient margin in case of future disturbance of the network (sub-step 43). In the example considered, the range of the modulator box $4_4$ is thus adjusted to the minimum necessary, as represented by the dotted circle $7_4$ of FIG. 3.

On completion of step 40, it is advisable to test the network as a whole, during a step 50, so as to ensure that the new component does not disturb the complete equilibrium of the network. Accordingly, the installation drive box 8 transmits a command for continuous communication of each of the constituent appliances of the PLC network with all its interlocutors. For each of the "appliance-interlocutor" pairs, a communication test is uploaded to the installation drive box 8, which can thus validate or reject the installation. In case of communication failure between two appliances, the installation drive box 8 can decide to set the transmission power of one or the other of the appliances, until the whole operates correctly. When the various tests have been conducted successfully, the installation drive box 8 can transmit a control signal again authorizing the PLC communications of nominal operation on the network as a whole.

In the embodiment of the optimization system described previously, the "master" device of the network consists of the installation drive box 8, which has to be installed locally. This "master" device is necessary only in case of change of topology of the network (addition or removal of an appliance, maintenance in case of a fault, etc.). It can be removed, or remain inactive, for the remainder of the time.

Other embodiments are nonetheless conceivable: in particular, in the application considered here by way of example, it was seen that the central platform 5 is able to communicate directly with the drive boxes acting as relays by communication means of cellular telephony (GPRS/3G) or ADSL type. It is thus possible for the central platform and the "master" device to constitute just a single entity, thereby avoiding having to install a dedicated device locally.

As was indicated previously, the intelligent management of the PLC transmission power can advantageously take place at any time during the use of the system, to take into account any situation liable to impact the network (case where the communication between two appliances no longer gets through, fault with an appliance, maintenance needs, etc.). Accordingly, the optimization method according to the invention furthermore comprises a step of dynamic adaptation of the PLC transmission power of at least one communicating appliance of the PLC network, in the case where the latter encounters difficulties of communication with the network appliance or appliances with which it is paired. For example, if the drive box $3_1$ of FIG. 2 detects that its quality or communication signal with one or the other of the modulator boxes $4_1$, $4_2$ with which it is paired is degraded below a certain threshold, it can attempt to restore the communication by increasing its own PLC transmission power. If the attempt fails, an alert is uploaded to the central platform so as to involve a technician.

It may be chosen that all or only some of the components of the home-automation system are able to perform this dynamic management of their own transmission power.

Likewise, if this drive box $3_1$ detects a start of saturation of the bandwidth (the signal remains high but the communication failure rate exceeds a certain threshold), it can upload an alert to the "master" device (installation drive box 8 if present or central platform 5), which will then ask the various components, one after the other, to lower their transmission power so as to adjust it as closely as possible to the needs, or indeed undertake a recasting of the topology of the network by changing the pairings between the modulator boxes and the drive boxes. It should be pointed out that the conditions of use of the network can be modified on account of causes exogenous to the network (in the case of modification of the user's electrical installation for example).

Although the invention has been described in its application to a system for measurement and modulation in real time of electrical devices, it will be readily understood that it is generalizable to any home-automation system comprising a plurality of devices able to exchange data in a local PLC network, provided that these devices do not need to be arranged according to a totally meshed network.

The invention claimed is:
1. A method for optimizing a home-automation system having a plurality of communicating appliances able to exchange information among themselves via a local low-bitrate Power Line Communication (PLC) network, said method comprising:
 an adjusting phase for adjusting a PLC transmission power transmitted by a new communicating appliance joining said local low-bitrate PLC network, wherein said adjusting phase includes the steps of:
 a) installing said new communicating appliance, said new communicating appliance having said PLC-transmission power set to a predefined maximum power in said local low-bitrate PLC network;
 b) cutting any communication in progress on the local low-bitrate PLC network, except for communications in progress of said new communicating appliance;
 c) testing communication with said new communicating appliance for each of the plurality of communicating appliances in the local low-bitrate PLC network with which said new communicating appliance is to be paired, and, in case of a communication failure, automatically incremental increasing a PLC transmission power for each of the plurality of communicating appliances until obtaining a first value of the PLC transmission power for each of the plurality of communicating appliances for which a PLC communication can be initialized between each of the plurality of communicating appliances and said new communicating appliance;
 d) on completion of step c), automatically reducing the PLC transmission power of said new communicating appliance as long as communication between each of the plurality of communicating appliances and said new communicating appliance is operational.

2. The method as claimed in claim 1, wherein said method further comprises a step of dynamic adaptation of the PLC transmission power of at least one the plurality of communicating appliances of the local low-bitrate PLC network, in the case where the at least one of the plurality of communicating appliances encounters difficulties communicating with any of the communicating appliances of the plurality of communicating appliances with which it is paired.

3. The method as claimed in claim 2, wherein said step of dynamic adaptation includes detection by said at least one of the plurality of communicating appliances of a degradation of PLC signal quality, followed by an attempt to restore communication by automatically increasing PLC transmission power of the at least one of the plurality of communicating appliances.

4. The method as claimed in claim 2, wherein said step of dynamic adaptation step includes detection by the at least one of the plurality of communicating appliances of a communication failure rate exceeding a predetermined threshold, followed by an automatic reduction in the PLC transmission power of some or all of the plurality of communicating appliances of the home-automation system.

5. A home-automation optimization system for optimizing a home-automation system that has a plurality of communicating appliances able to exchange information among themselves via a local low-bit-rate Power Line Communication (PLC) network,
 wherein said home-automation optimization system comprises:
 a master device connected to the low-bitrate PLC network, configured to optimize said home-automation system when a new communicating appliance is added to said home-automation system, said master device being configured to:

set a PLC transmission power for said new communicating appliance to a predefined maximum power in said low-bitrate PLC network;

cut any communication in progress on the local low-bitrate PLC network, except for communications in progress for said new communicating appliance;

test communications with said new communicating appliance with each of the plurality of communicating appliances of the local low-bitrate PLC network with which said new communicating appliance is to be paired, and, in case of a communication failure, automatically incremental increase a PLC transmission power of each of the plurality of communicating appliances until obtaining a first value of the PLC transmission power for each of the plurality of communicating devices for which a PLC communication can be initialized between each of the plurality of communicating appliances and said new communicating appliance; and automatically reduce the PLC transmission power of said new communicating appliance as long as said communication between each of the plurality of communicating appliances and said new communicating appliance is operational.

6. The home-automation optimization system as claimed in claim 5, wherein said master device is an installation drive box installed locally in the local low-bitrate PLC network.

7. The home-automation optimization system as claimed in claim 6, wherein said installation drive box transmits said control signals via the local low-bitrate PLC network.

8. The home-automation optimization system as claimed in claim 6, wherein said installation drive box transmits said control signals via a distinct link of the local low-bitrate PLC network, said distinct link selected from a group consisting of ADSL, cellular, radio or Wifi links.

9. The home-automation optimization system as claimed in claim 5, wherein said master device is a central external platform hosted by an Internet network, transmitting said control signals via a connection of packet telephony or ADSL.

10. The home-automation system as claimed in claim 5, wherein at least one of the plurality of communicating appliances in the local low-bitrate PLC network is further configured to detect a degradation of PLC signal quality, and to automatically increase PLC transmission power of said at least one of the plurality of communicating appliances to attempt to restore said degradation of PLC signal quality.

11. The home-automation optimization system as claimed in claim 5, wherein at least one of the plurality of communicating appliances in the local low-bitrate PLC network is configured to detect a communication failure rate exceeding a predetermined threshold, and said master device of the local low-bitrate PLC network orders an automatic reduction in a PLC transmission power of some or all of the plurality of communicating appliances of the home-automation system.

12. The home-automation optimization system as claimed in claim 5, wherein some of the plurality of communicating appliances in the local low-bitrate PLC network are modulator boxes linked to one or more electrical devices, the modulator boxes measuring, in real time, voltages and currents consumed by the electrical devices linked thereto, said some of the plurality of communicating appliances also including drive boxes that are able to transmit commands to order the interruption of the power supply to all or some of the electrical devices linked to the modulator boxes.

* * * * *